Nov. 26, 1929.  J. K. KOLB  1,737,377
FERTILIZER DISTRIBUTOR
Filed Nov. 26, 1927
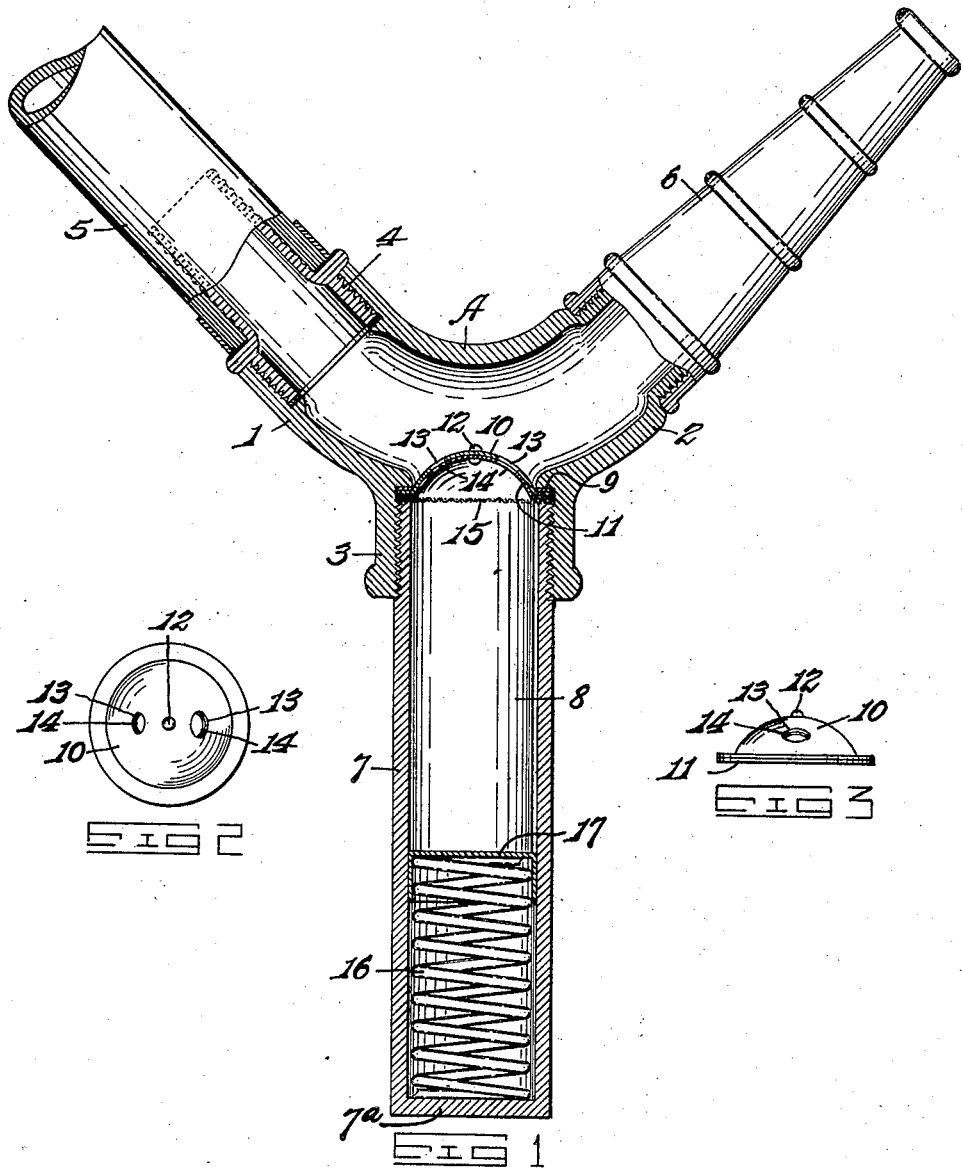
INVENTOR
J. K. Kolb
BY
N. E. Dunlap
ATTORNEY Patented Nov. 26, 1929

1,737,377

UNITED STATES PATENT OFFICE

JOHN K. KOLB, OF WHEELING, WEST VIRGINIA

FERTILIZER DISTRIBUTOR

Application filed November 26, 1927. Serial No. 235,853.

This invention relates broadly to distributors for fertilizers and the like, and it has for its primary object to provide, in association with a garden hose and the spray nozzle thereof, an attachment embodying a container for a quantity of soluble chemical fertilizing material and means for passing in contact with such material a moiety of the water which passes through the hose, whereby such material is gradually dissolved and carried outward and distributed with the water.

A further object is to provide a device of the character mentioned having means whereby the admission of water for contacting with the contained fertilizing material may be regulated to the extent that any desired strength of the solution for distribution may be produced.

With these and other objects in view, the invention resides in the features of construction, arrangement of parts, and combinations of elements which will hereinafter be fully described, reference being had to the accompanying drawings, in which—

Figure 1 is a longitudinal section of the invention, illustrating an application thereof;

Figure 2 is a top plan view of the controlling means, detached; and—

Figure 3 is a side elevation of the same.

Referring to said drawings, A designates generally a coupling of approximately T-head form, having opposite arms 1 and 2 which may be disposed in axial alinement, as in the usual T-coupling. It is preferred, however, that the head of the T-structure shall have an arcuate curvature, thus to dispose the ends of said arms 1 and 2 at substantially right angles to each other and at angles of approximately 135° to the stem 3 of the coupling.

The coupling is designed for mounting in a water line, as between the ends of a flexible hose, one of said arms, as the arm 1, being adapted to have attached thereto, as by a threaded union 4, one end of a water line or hose 5 and the opposite arm being likewise adapted to have attached thereto either a hose nozzle 6, a suitable form of spray device, or an end of a second length of hose which carries such a nozzle or spray device on its opposite end.

The tubular stem 3 of the coupling, located, as described, on the outer side of the arc described by the head, has threaded therein the open end of a cylindrical casing, or magazine, 7 which constitutes a container for a cylindrical block or cartridge 8. Said cartridge may be composed of a solidified soluble mass, or composition, of the material which is to be distributed, which material may consist of one or more concentrated chemical substances possessing fertilizer values, or it may embody one or more substances for distribution as an insecticide or the like.

Interposed between the open end of the magazine 7 and an internal annular shoulder 9, or an equivalent part, borne by the stem 3 are the annular edge portions of two disks 10 and 11 which are pivotally related, being attached together at a central point by means of a pivot pin 12. Provided in said disks 10 and 11 are orifices 13 and 14, respectively, which, by rotation of the disk 10, are adapted to be brought more or less into registering relation for regulating the extent to which water, in passing through the arms 1 and 2, is admitted into contact with the exposed upper end of the cartridge 8, and, consequently, for controlling the rate at which the material of said cartridge is dissolved and passed outwardly with the flowing water for distribution. The orifices 13 and 14 may be provided in one or more pairs, as desired, two such pairs being shown in the drawings. It is preferred that the disks 10 and 11 have the dome shape illustrated, each being made of concavo-convex form.

The cartridge is at all times maintained in elevated relation to said disks 10 and 11, or to a disk 15 made of fine-wire mesh which underlies said disks 10 and 11, a compression spring 16, interposed between the bottom 7ª of the magazine and the adjacent end of the cartridge, serving to advance the cartridge as the latter is dissolved in use of the device. As herein shown, the cartridge is seated upon a plunger-like member 17 of inverted-cup form which is movable within the magazine and which embraces the adjacent end of the spring 16.

In practice, the cartridge is introduced within the magazine and, being forced inwardly against the tension of the spring, the threaded end of the magazine is introduced within the stem 3 of the T-coupling A and is screwed up against the disks 15, 11 and 10 for holding said disks in place, the disk 10 having been previously adjusted relative to the disk 11 to dispose the orifices 13 and 14 in register to the extent required for effecting dissolving and distribution of the material of the composition at the desired rate. As is manifest, said material is discharged through the nozzle or other form of spray device employed. The water admitted into dissolving relation to the end of the cartridge carries outward therewith the dissolved material and is commingled with the water which is passed directly through the coupling.

What is claimed is—

1. A device of the character described, comprising a T-coupling adapted for mounting in a water line with its head portion disposed to form an unobstructed passsage for the water flowing through said line, said head portion having arcuately curved form, a hollow cylindrical magazine forming a container for a cartridge of soluble composition material, said magazine having one end closed and its opposite open end removably mounted on the stem portion of said coupling intermediate the ends of the latter and on the outer curved side thereof, and relatively adjustable disks interposed in engaged relation between said water passage and the cartridge, said disks having dome shape and having therein orifices adapted, by relative adjustment of the disks, to be disposed more or less in registering relation for passing a moiety of the flowing water in contact with said cartridge, and a foraminous member disposed horizontally beneath said disks and adapted to be abutted by the cartridge.

2. A device of the character described, comprising a T-coupling adapted for mounting in a water line with its head portion disposed to form an unobstructed passage for the water flowing through said line, said head portion being curved to dispose its ends at substantially right angles to each other and having its stem portion disposed at an angle to said ends greater than a right angle, a hollow cylindrical magazine forming a container for a composition cartridge of soluble material, said magazine having an end thereof threaded on said stem portion of the coupling intermediate the ends of the latter and on the outer sides of the curve thereof, and a pair of relatively adjustable dome-shaped disks interposed between the water passage and the adjacent end of the magazine and projecting into said passage, said disks having orifices therein through which water in controlled volume may be flowed into contact with the adjacent end of the cartridge.

In testimony whereof, I affix my signature.

JOHN K. KOLB.